Patented Jan. 10, 1933

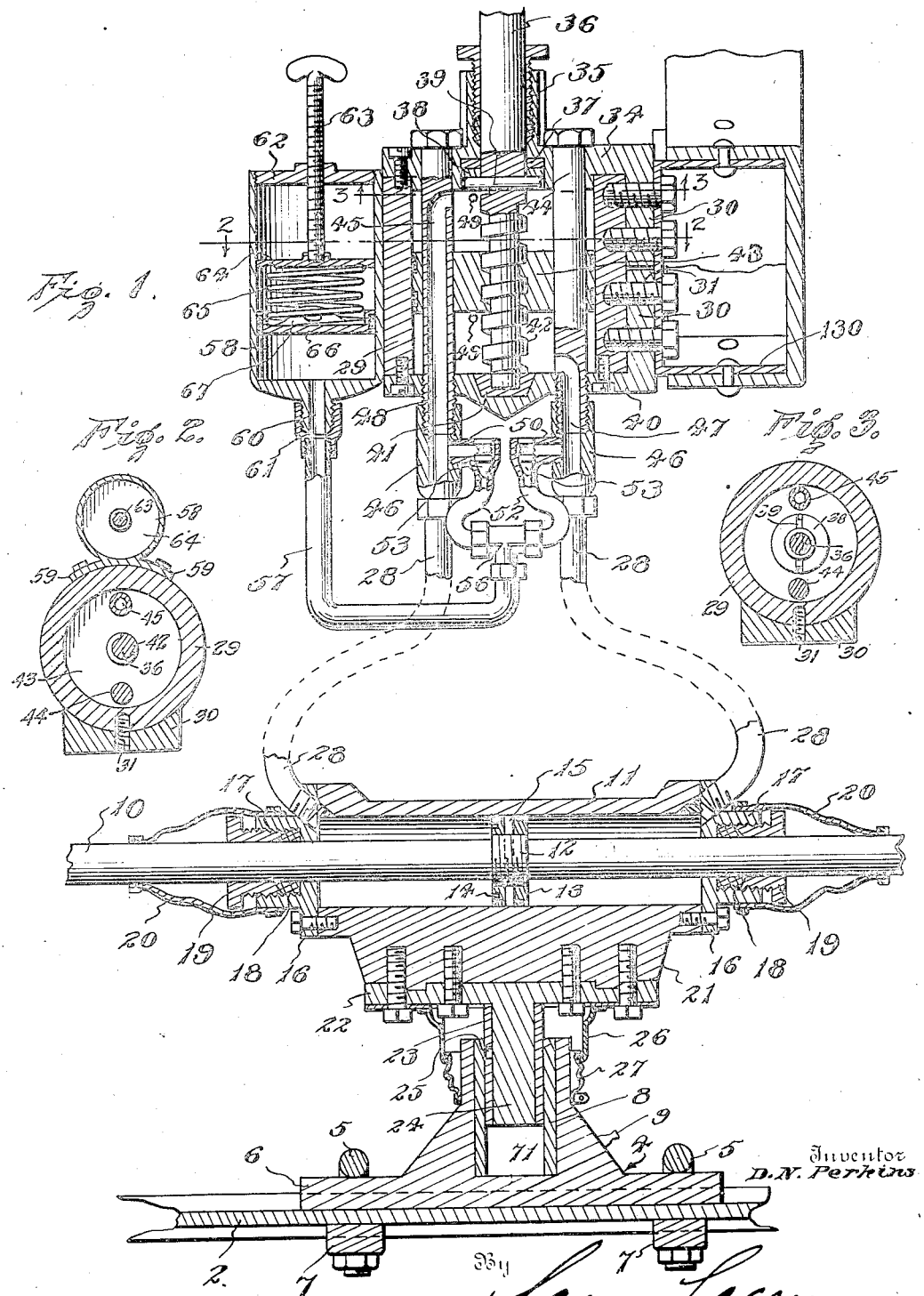

1,894,055

UNITED STATES PATENT OFFICE

DAVID N. PERKINS, OF NORWOOD, OHIO

STEERING GEAR

Application filed July 11, 1929. Serial No. 377,482.

The object of this invention is to provide an automobile steering gear by the use of which all wobble or lateral vibration of the steering wheels will be eliminated. The invention also has for its object the provision of a fluid-actuated apparatus whereby the steering of the vehicle may be accomplished with very little effort and the working parts will be protected from the access of dirt and moisture so that they will always be in an operable condition. The invention is illustrated in the accompanying drawing and consists in certain novel features which will be hereinafter first fully described and then more particularly pointed out in the appended claims.

In the drawing:

Fig. 1 is an enlarged longitudinal section through the steering apparatus,

Fig. 2 is a detail section on the line 2—2 of Fig. 1,

Fig. 3 is an enlarged detail section on the line 3—3 of Fig. 1.

In carrying out my invention, there is provided a socket member 4 which is secured to the front axle 2 by clip bolts 5 each passing around one projecting end member 6 of the socket and across the axle and engaged with clip plates 7 in a well known manner. At the center of the socket member is a rearwardly projecting body which is tapered and hollow, as shown at 71, a bushing 8 of bronze or the like being fitted in the hollow chamber 71 and having a cross sectional conformation the same as that of the chamber so that it will be held firmly therein and will not be permitted to rotate. The socket member is provided with fittings 9 whereby lubricant may be forced into the socket to overcome possible frictional wear between the contacting surfaces. The usual tie rod of the steering gear is shown at 10. In accordance with the present invention, a cylinder 11 is fitted around the tie rod and within the cylinder the tie rod is provided with a threaded portion 12 onto which is engaged a piston 13. The piston is provided with sockets 14 whereby it may be engaged by a spanner wrench to be turned home on the threaded portion of the tie rod and a locking pin 15 is inserted through the piston and the threaded portion of the tie rod to prevent detachment of the piston from the rod. When the wheels are set for straight ahead travel, the threaded portion 12 of the tie rod 10 will be disposed midway the ends of the cylinder 11, which is the position shown in Fig. 1, and the wheels will be set in angular position to guide the vehicle to one or the other side accordingly as the piston is moved toward one or the other end of the cylinder. The cylinder has caps 16 secured to its ends to close the same and upon each cap is formed a stuffing box 17 receiving packing 18 and engaged by a gland nut 19 whereby the packing will be compressed around the tie rod. To prevent the access of dirt and water to the joint, a flexible cover or hood 20 of any waterproof material is clamped around the respective stuffing box 17 and the tie rod, as clearly shown. The cylinder is provided with an enlargement 21 on its forward side to which is secured by bolts or screws a base plate 22 having a tongue 24 projecting centrally from its front side. The tongue is of the same cross sectional outline as the bushing 8 and fits snugly within a sleeve 23 having the same cross-sectional contour and fitting closely but slidably in the bushing 8, as shown in Fig. 1, so that, while relative rotation between the axle and the tie rod is prevented, the movement of the tie rod toward and from the axle in steering will be accommodated. In the side of the sleeve 23 is an opening 25 in which a pry may be inserted when it is desired to remove the sleeve. Secured to the end portions of the base plate 22 on the front side thereof is a tubular metal body or collar 26 to the front edge of which is secured a hood 27 of some flexible waterproof material which has its front end portion clamped around the rearwardly projecting portion of the socket member 4, as clearly shown. The collar or body 26 may conveniently be formed from a flat sheet metal blank and the edge of the hood may be secured by crimping the edge of the metal blank over the edge of the hood fabric, and after the blank has been folded or bent or pressed so as to assume a form which will permit it to fit around the tongue, the edges of the hood are sewed together. It will be seen at once that this construction provides a telescopic cover for the joint between the tongue and the socket member so that, while the movement of the same will be accommodated, access of foreign matter thereto is prevented.

The piston 13 is moved within the cylinder 11 by pressure exerted thereon through a fluid, such as oil, admitted to the cylinder through the end caps thereof by flexible pipes 28 extending from a controlling cylinder which is secured upon the chassis of the vehicle. This controlling cylinder is shown at 29 and its upper and lower ends are closed by caps 34 and 40, respectively, each of which has a wing or flange 30 fitting between the side of the cylinder and the side of the chassis sill while a bracket 130 is rigidly secured within the channel of the sill. Threaded openings 31 are formed through the lips or flanges 30 and in the side of the cylinder to receive bolts, which are inserted through slots or elongated openings in the bracket 130 whereby the cylinder 29 and the steering column may be set at the most convenient angle. The upper cap 34 rests directly on the upper end of the cylinder 29 and is secured thereto by bolts or cap screws, as will be understood, being provided on its upper side with a gland or packing box 35 receiving the steering rod 36 and adapted to compress packing around the rod in a well known manner. In the under side of the cap 34 is a central recess in which is fitted a brass bearing plate 37 and a lower steel bearing plate 38, the plate 38 having a diametrical groove in its under side to receive a pin 39 which is passed through the steering rod so as to pin the bearing plates to the rod. The lower cap 40 is provided at its center in its upper side with a recess receiving a bronze cup 41 constituting a step bearing for the lower end of the steering rod, and within the cylinder, between the upper and lower caps, the steering rod is formed with a coarse thread 42. Within the cylinder 29 is a piston 43 having a threaded central bore which engages with the threaded portion of the steering rod so that, when the rod is turned, the piston will be caused to travel along the axis of the cylinder. Tubular bolts 44 and 45 are fitted through openings provided therefor in the caps 34 and 40, the openings in the cap 34 being smooth and the openings through the cap 40 being threaded, as shown. The lower ends of the bolts are threaded so as to firmly engage the openings in the lower cap 40 and they are of such length that their lower ends will project below the cap to receive fittings 46. As stated, the bolts 44 and 45 are tubular and the bore of the bolt 44, indicated at 47, opens through the side of the bolt immediately above the lower cap 40 so that oil supplied to the bolt will be fed into the cylinder 29 below the piston 43 therein while the bore 48 of the bolt 45 extends nearly to the upper end of the bolt and opens into the cylinder immediately below the cap 34 to feed the oil or other fluid above the piston 43. It is also to be noted that the conductor bolts 44 and 45 are spaced inwardly from the wall of the cylinder so that they pass through the piston and form guides for the same to prevent it rotating with the steering rod. Consequently, when the rod is rotated, the piston must move longitudinally thereof. The cylinder is provided at its upper end and at a point just below the piston, when the piston is midway the height of the cylinder, with vent openings 49 through which trapped air may be permitted to escape when the apparatus is being refilled. These openings, of course, are normally closed by plugs.

The fittings 46 which have been mentioned are threaded onto the lower ends of the respective tubular conducting bolts 44 and 45 and the upper ends of the pipes 28 are secured to the lower ends of the respective fittings, the pipes 28 being mounted on the chassis sill for the greater portion of their lengths. In the side of each fitting is secured a valve casing 50 which is in direct communication with the bore of the fitting. On the under side of each valve casing is a valve seat to which is attached in any convenient manner one end of a tube 52, and normally resting in the seat is a tapered valve body 53 which is yieldably held to the seat by an expansion spring disposed above the valve and bearing thereon. Alined axially with the valve, a plug is threaded into the upper side of the valve casing whereby the pressure of the spring may be regulated and access had to the valve when cleaning or repair of the same may be necessary. The tube 52 is formed of some material which may be easily bent and will retain the shape into which it is bent.

The tubes 52 extend to and are coupled to the opposite ends of a T-coupling 56 and to the lateral branch of this fitting is attached one end of a tube 57 which leads from a stabilizer and filling cylinder or reservoir 58. This cylinder 58, as shown in Fig. 2, is constructed with wings 59 on one side fitting to the controlling cylinder 29 and secured thereto by cap bolts or screws, as will be understood. On its lower end, the cylinder 58 is provided with a nipple 60 to which the end of the tube 57 is connected by a coupling sleeve 61, and in the upper end of the cylinder is removably fitted a cap plate 62 having a central threaded opening receiving an adjusting screw or rod 63. Carried by the lower end of the adjusting rod or screw 63 is a piston plate 64 beneath which is an expansion spring 65 attached to a lower piston plate 66, said lower plate having a lug 67 on its upper side provided with an opening therethrough whereby it may be engaged by a hook when the piston is to be withdrawn. When the apparatus is to be rendered operative, the cap 62 and the piston are removed, and oil is poured into the cylinder 58 and permitted to pass therefrom until the cylinder 11, the pipes 28 and the cylinder 29 are filled, after which the cap plate 62 is restored and the screw 63 adjusted so that the tension of the spring 65 will be brought to the proper degree to maintain a constant pressure upon the liquid body.

The operation will, it is thought, be readily understood from the foregoing description, taken in connection with the accompanying drawing. The apparatus having been filled with the oil as described, the oil, being non-compressible, will serve as a flexible coupling between the moving parts. When the wheels are set to travel straight ahead, the piston 13 will be at the center of the cylinder 11 and the piston 43 will be at the center of the cylinder 29. If the steering rod 36 be now rotated in one or the other direction, the oil will be forced forward by the advancing side of the piston 43 and this advancing oil or other liquid will be caused to exert pressure upon the piston 13 in the cylinder 11 and effect movement of the same in the proper direction to shift the tie rod and set the steering wheels at the desired angle. The movement of the piston 13 will be accommodated by the movement of the piston 43 so that the liquid at the advancing side of the piston 13 will be driven through the tubular connections to occupy the space at the trailing side of the piston 43. When the steering rod is rotated to cause travel of the piston 43 in the opposite direction, a reverse flow of the liquid is set up, so that the pistons will be brought to rest and will always move together. The check valves 53 are seated always unless the pressure in the cylinder 29 should happen to become less than the pressure on the under sides of the valves in which event the valves would be opened against the force of the springs and fluid then permitted to flow into the cylinders. The cylinder 58 constitutes a reservoir for a reserve supply of the liquid and also as a refilling and stabilizer unit and the cylinder 11, while confining the liquid which acts directly upon the tie rod and the piston thereon, also aids in stabilizing the pressure on said piston. Should the volume of the liquid in the working parts for any reason decrease, downward movement of the piston 66 may be effected by properly rotating the adjusting screw 63 and an additional supply of liquid thereby forced into the working passages. The spring 65 will, of course, yield to fluctuations in the working liquid so that if rolling or surging should occur in the cylinder 58 the movement will be accommodated and the pressure will be stabilized. The non-compressibility of the liquid serves to maintain the pressure upon the steering piston 13 at all times so that it will be held steadily in the position in which it may be set and the lateral oscillation of the steering wheels which has been found to be objectionable heretofore is positively overcome.

Having thus described the invention, I claim:

1. In a vehicle steering gear, a cylinder, tubular bolts fitted through the ends of the cylinder and spaced inwardly from the wall thereof, one of said bolts having its bore opening into the cylinder at the lower end thereof and the other bolt having its bore opening into the cylinder at the top thereof, a piston within the cylinder slidably fitted upon said bolts, a steering rod journaled in the ends of the cylinder and extending through and having threaded engagement with the piston whereby rotation of the steering rod will effect travel of the piston longitudinally of the cylinder, means for supplying pressure fluid to the cylinder through said tubular bolts, and means whereby the pressure fluid will be caused to shift the steering wheels of the vehicle when said piston is moved.

2. In a vehicle steering gear, a cylinder, a piston therein, a steering rod engaged with the piston to effect travel of the same longitudinally of the cylinder, tubes opening into the cylinder at opposite sides of the piston and forming guides for the piston, means whereby travel of the piston will cause movement of fluid in said tubes to effect shifting of the steering wheels of the vehicle, a reservoir mounted adjacent the cylinder, tubular connections between the reservoir and the first-mentioned tubes, and check valves in said tubular connections.

In testimony whereof I affix my signature.

DAVID N. PERKINS. [L. S.]